United States Patent
Shepherd

(10) Patent No.: US 7,549,260 B2
(45) Date of Patent: Jun. 23, 2009

(54) GRILLE

(76) Inventor: John D. Shepherd, 15765 Annico Dr., Lockport, IL (US) 60442

( * ) Notice: Subject to any disclaimer, the term of this patent is extended or adjusted under 35 U.S.C. 154(b) by 177 days.

(21) Appl. No.: 11/649,519

(22) Filed: Jan. 3, 2007

(65) Prior Publication Data
US 2008/0155933 A1  Jul. 3, 2008

(51) Int. Cl.
*E04C 2/42* (2006.01)
(52) U.S. Cl. .............. 52/668; 52/665; 403/364
(58) Field of Classification Search .............. 52/660, 52/662, 663, 664, 665, 667, 668, 666, 456, 52/223.7, 507; 15/215, 238; 403/364, 339, 403/319, 318
See application file for complete search history.

(56) References Cited

U.S. PATENT DOCUMENTS

| | | | | | |
|---|---|---|---|---|---|
| 168,615 | A | * | 10/1875 | Childs | 126/167 |
| 254,688 | A | * | 3/1882 | Parkison | 126/167 |
| 377,580 | A | * | 2/1888 | Spelman | 15/238 |
| 846,291 | A | * | 3/1907 | Emerson | 52/663 |
| 950,236 | A | * | 2/1910 | Melish | 52/669 |
| 1,139,468 | A | * | 5/1915 | Potter | 209/401 |
| 1,612,977 | A | | 1/1927 | Lundstead | |
| 1,723,775 | A | * | 8/1929 | Fleming | 126/168 |
| 1,734,660 | A | * | 11/1929 | Williams et al. | 52/669 |
| 1,779,497 | A | * | 10/1930 | Secor | 52/667 |
| 1,841,081 | A | | 1/1932 | Bennett | |
| 1,867,702 | A | | 7/1932 | Keown | |
| 2,033,376 | A | * | 3/1936 | Hanson et al. | 52/662 |
| 2,128,753 | A | | 8/1938 | Lienhard | |
| 2,388,927 | A | * | 11/1945 | Moor, Jr. | 52/663 |
| 2,858,582 | A | * | 11/1958 | Toulmin, Jr. | 52/578 |
| 2,918,995 | A | * | 12/1959 | Kruger | 52/668 |
| 3,462,181 | A | * | 8/1969 | Lewis | 52/586.1 |
| 3,626,647 | A | * | 12/1971 | Guzelimian | 52/80.2 |
| 3,948,013 | A | * | 4/1976 | Lobaugh et al. | 52/669 |
| 4,037,383 | A | * | 7/1977 | Diebold et al. | 52/664 |
| 4,156,299 | A | * | 5/1979 | Kovac | 16/108 |
| 4,282,695 | A | * | 8/1981 | Lew | 52/668 |
| 4,727,704 | A | * | 3/1988 | Carlton | 52/667 |
| 4,760,680 | A | * | 8/1988 | Myers | 52/669 |
| 4,897,299 | A | * | 1/1990 | Kawachi et al. | 428/131 |
| 4,928,471 | A | * | 5/1990 | Bartley | 52/664 |
| 4,930,753 | A | * | 6/1990 | Alvyn | 256/26 |
| 5,784,741 | A | * | 7/1998 | Mangone | 14/73 |
| 5,865,007 | A | * | 2/1999 | Bowman et al. | 52/664 |
| 6,694,697 | B2 | * | 2/2004 | Shepherd | 52/668 |
| 2006/0218872 | A1 | * | 10/2006 | Bigott | 52/660 |

* cited by examiner

*Primary Examiner*—Robert J Canfield
*Assistant Examiner*—Jessie Fonseca
(74) *Attorney, Agent, or Firm*—Greer, Burns & Crain, Ltd.

(57) ABSTRACT

In an array of parallel cross bars, each cross bar has a crenellated edge with alternating recesses and projections. A first locking opening extends through the length of the each cross bar, at least partly within the projections. A number of bearing bars each include second locking openings spaced along the length of the bearing bar. The bearing bars are assembled with the cross bars with the bearing bars nested in the recesses in the cross bars. The first and second locking openings are in alignment. A locking member is received in the aligned locking openings to interlock the bearing bars and cross bars in a rigid, strong, durable and attractive grille structure.

16 Claims, 3 Drawing Sheets

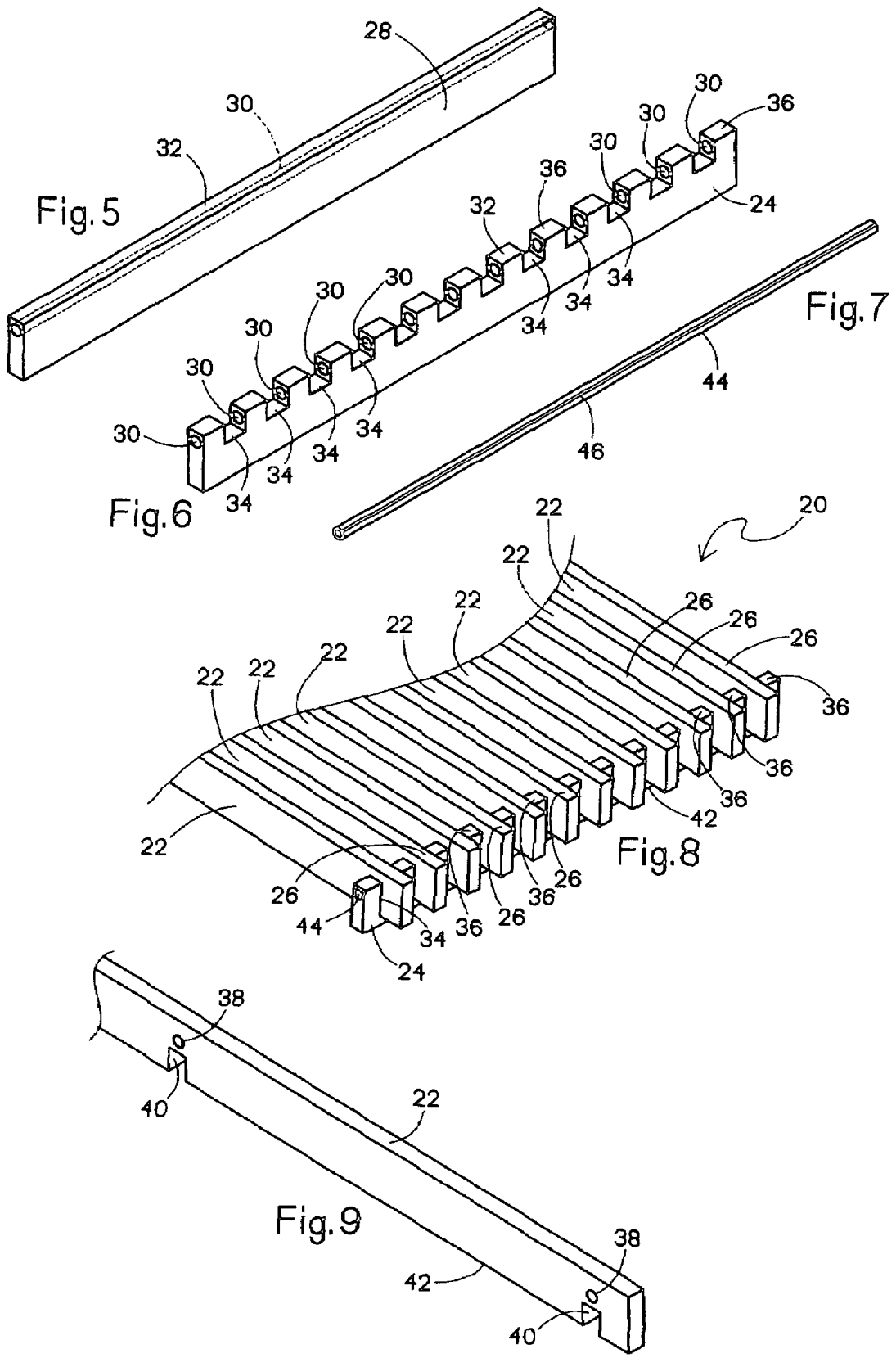

GRILLE

FIELD OF THE INVENTION

The present invention relates to an improved grille characterized by strength, durability and attractive appearance.

DESCRIPTION OF THE PRIOR ART

Grilles (also called gratings, lattices, louvers, etc), of many types are used for many purposes. A typical grille includes a number of main bars or bearing bars extending generally parallel in a first direction, with cross bars or support bars extending in a transverse direction. The bars are attached at the intersections to form a rigid structure. Grilles are often employed in floors or the like and require substantial strength in order to be load bearing. Grilles should be durable and long lasting. As architectural elements, grilles should be attractive in appearance.

One well known type of grille is made by welding the main bars and cross bars together at the intersections. A problem with this approach is that expensive equipment or a large amount of labor is required to make the numerous welds required for a grille. Another problem is that welds can be messy, requiring post assembly cleaning and trimming of weld splatter and smoke discoloration. A further disadvantage is that welding may not be practical when the main and cross bars are of dissimilar materials.

In order to overcome disadvantages of welding, grilles can be made using a tight tolerance press fit. Slots in the main and cross bars are mated at the intersections with a large force and the resulting interference fit mechanically holds the assembly together. The equipment needed to make this type of grille is specialized and very expensive. In addition, the close tolerances needed for the bar structures adds to the cost.

Other grilles are made with fasteners. For example, rivets can be used to attach crimp bars to main bars to make a strong load bearing grille. Grilles can be also made by deforming the material of the bearing bars or cross bars at the intersections. An example of this approach can be found in U.S. Pat. No. 6,694,697. These types of grille can be expensive and time consuming to make due to the riveting or the deforming process. in addition, for many architectural applications, a grille including fasteners or deformations may not be as attractive as a grille having a simple, clean, geometrical pattern of crossing bars.

SUMMARY OF THE INVENTION

Objects of the present invention are to provide an improved grille that can be made with a minimum of labor and machinery expense; to provide a grille that has an attractive, neat appearance without requiring any post assembly cleaning; to provide a grille that can be made of bars of a wide variety of different materials sizes and shapes; to provide a grille that has ample strength for load bearing applications and that has an attractive appearance for decorative applications; and to provide a grille overcoming disadvantages of grilles known in the past.

In brief, in accordance with the present invention, there is provided a grille including a plurality of first bars extending in a first direction and a plurality of second bars extending in a second direction and crossing the first bars at intersections. The first bars each include a crenellated edge having a plurality of alternating recesses and projections. The second bars are nested in the recesses of the first bars at the intersections, and the projections are sandwiched between the second bars between the intersections. Each of the first bars includes a first locking opening extending lengthwise within the first bar, at least a part of the first locking opening extending through the projections. Each of the second bars includes a plurality of second locking openings extending transversely through the second bar. The first and second locking openings are aligned when the second bars are nested in the recesses of the first bars. Locking members extend through the first and second locking openings to interlock the first and second bars.

BRIEF DESCRIPTION OF THE DRAWING

The present invention together with the above and other objects and advantages may best be understood from the following detailed description of the preferred embodiments of the invention illustrated in the drawings, wherein:

FIG. 5 is an enlarged isometric view of a cross bar of the grille in an intermediate stage of manufacture;

FIG. 6 is a view like FIG. 5 showing the manufactured cross bar;

FIG. 7 is an enlarged isometric view of a locking member of the grille;

FIG. 8 is an enlarged, fragmentary isometric view of a portion of bearing bar of the grille;

FIG. 9 is an enlarged, fragmentary isometric view of a portion of the grill with a cross bar, a locking member and a number of bearing bars assembled together;

DETAILED DESCRIPTION OF THE PREFERRED EMBODIMENT

Figure 1:
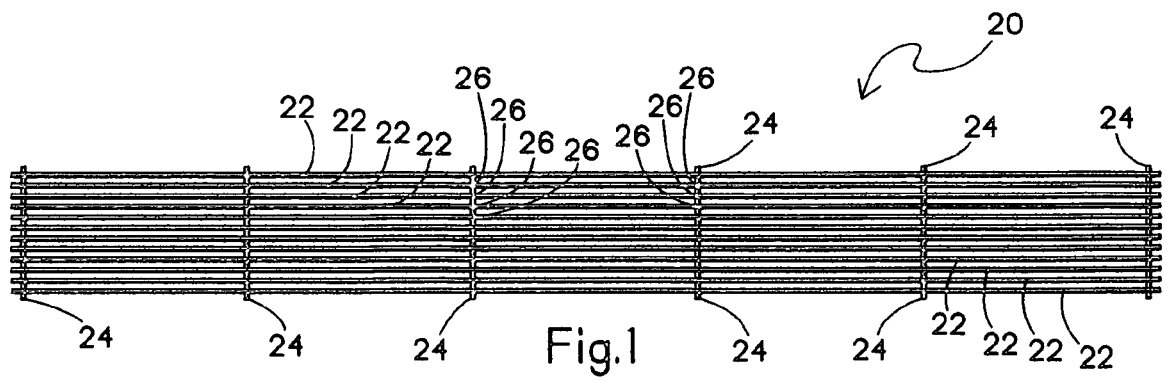
FIG. 1 is a top plan view of a grille constructed in accordance with the present invention.
Figure 2:
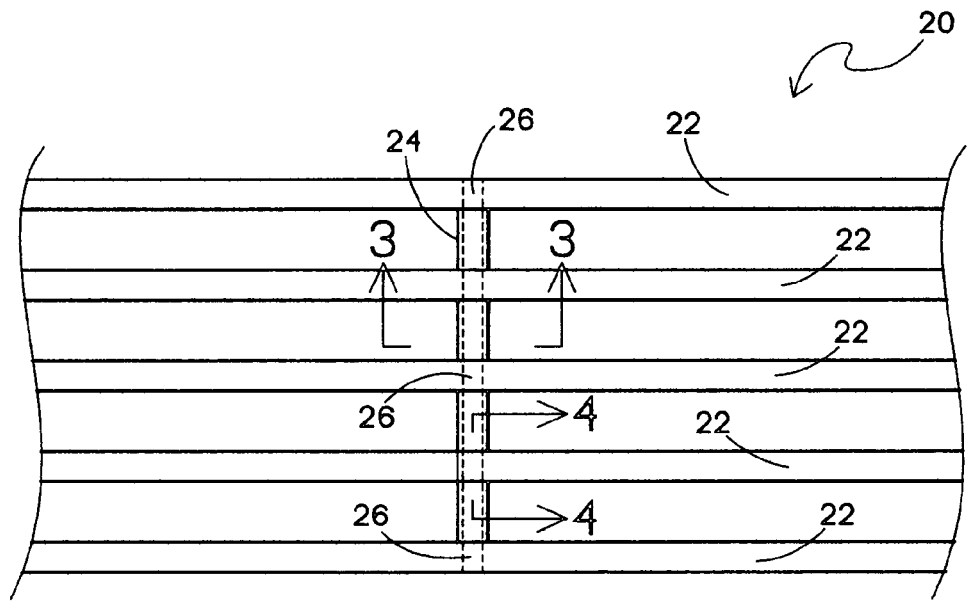
FIG. 2 is an enlarged, fragmentary top plan view of a portion of the grille of FIG. 1.

Having reference now to the drawing, and initially to FIG. 1, there is illustrated a grille 20 constructed in accordance with the principles of the present invention. The grille 20 includes a number of main or bearing bars 22 arranged parallel to one another and extending in a first rectilinear direction for the length of the grille 20. A number of support or cross bars 24 extend parallel to one another in a transverse, second rectilinear direction across the width of the grille 20. The bearing bars 22 and cross bars 24 cross one another at a plurality of intersections 26.

One of the identical cross bars 24 is illustrated in FIG. 6. The cross bar 24 is made from a length of bar stock 28 seen in FIG. 5. The bar stock 28 can be of any preferred material and configuration. For example it may be made of metal such as steel, brass or aluminum, and may have a width of three-eights inch and height of three-quarter inch or one inch. The material and size may be determined by the application for the grille 20.

A first internal locking opening 30 is formed along the length of the bar stock 28. The opening 30 is parallel to and adjacent to one edge 32 of the bar stock 28. The opening 30 can be formed in any desired manner, for example by drilling or by extrusion of the bar stock 28 including the opening 30.

To complete the cross bar 24, the edge 32 is crenellated. A series of regularly spaced recesses 34 is made by removing material from the edge 32. The width of the recesses 34 corresponds to the thickness of the bearing bars 22. Alternating with the recesses 34 are nonrecessed projecting portions 36. The width of the projections 36, i.e., the spacing between recesses 34, corresponds to the spacing between bearing bars 22 in the grille 20. After formation of the recesses 34, the first locking opening 30 extends in the longitudinal or axial direction through each of the projections 36. Considered another way, parts of the locking opening 30 are removed in the recesses 34 leaving a number of segments, one in each projection 36.

A segment of one of the identical bearing bars 22 is illustrated in FIG. 8. It is made from bar stock having a desired material and configuration and may be the same as or different from the bar stock 28 of the cross bars 24. A number of second locking openings 38 are formed at regularly spaced intervals along the length of the bearing bar 22. The openings 38 extend transversely across the width of the bar 22. In addition, at the same regularly spaced intervals, notches 40 are provided in one edge 42 of the bearing bar 22. The notches 40 have the same width as the cross bars 24, and the spacing between the openings 38 and between the notches 40 is equal to the spacing between the cross bars 24 in the grille 20.

Figures 3, 4:
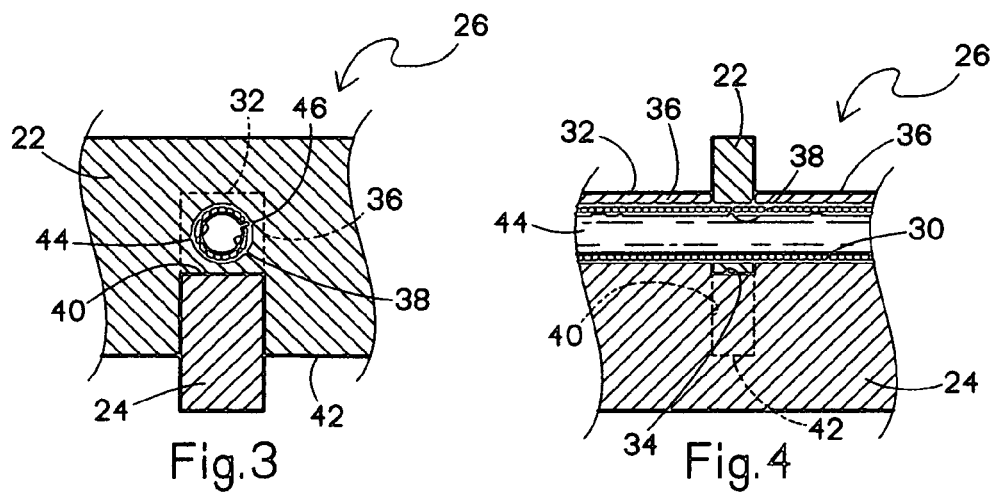
FIG. 3 is an enlarged fragmentary sectional view of the grille taken along the line 3-3 of FIG. 2.
FIG. 4 is an enlarged fragmentary sectional view of the grille taken along the line 4-4 of FIG. 2.
Figure 10:
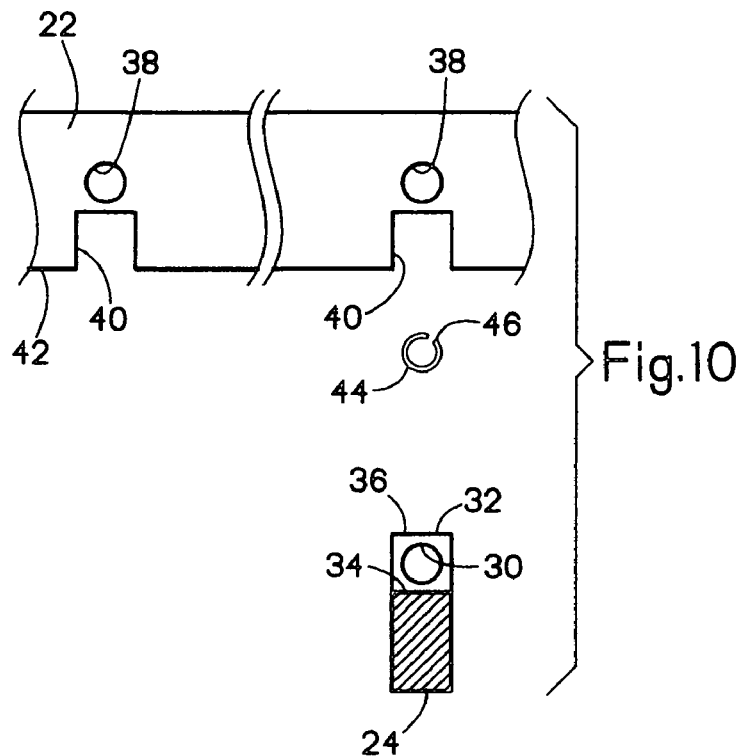
FIG. 10 is an enlarged, exploded, partly sectional side elevational view showing portions of a cross bar, bearing bar and locking member generally in the same orientation as seen in FIG. 3.

To assemble the bearing bars 22 and the cross bars 24 for the grille 20, the cross bars are arrayed in a spaced apart, parallel orientation. The edges 32 of the cross bars 24 face in the opposite direction as the edges 42 of the bearing bars 22. The bearing bars 22 are positioned so that they are nested within the recesses 34 of the cross bars 24 as seen in FIGS. 3 and 9. The portions of the cross bars 24 beneath the recesses 34 are received in the notches 40 (FIG. 4). As illustrated, the notches 40, recesses 34 and bars 22 and 24 are configured to that the bearing bars 22 project above the edges 32 of the cross bars 24, and so that the cross bars 24 project below the edges 42 of the bearing bars 24. If desired, other relative positions such as flush or recessed may be used. If desired, the notches 40 in the bearing bars 22 may be omitted. In one preferred arrangement, the cross bars may be spaced apart by about six to twelve inches and the bearing bars may be spaced apart by about one-half to one inch, although other configurations may be used.

When the bearing bars 22 and cross bars 24 are assembled together, the first and the second locking openings 30 and 38 are aligned with one another. The aligned openings 30 and 38 provide combined locking openings extending across the full width of the grille 40, one located along each cross bar 24. In order to interlock the bearing bars 22 and cross bars 24, a locking member 44 is inserted into each of these combined openings. When the locking member 44 is in place, the bars 22 and 24 cannot be separated from one another, and a rigid, strong and durable interlock connection is made. The locking member 44 is enclosed within the bars 22 and 24, providing an uncluttered, attractive appearance.

In the embodiment illustrated in FIGS. 1-10 of the drawings, the first and second locking openings have the same cross section shape, are both circular. The locking member 44 is an elongated circular member such as a rod or a tube having the same circular cross section shape. In the illustrated embodiment, the locking member 44 is preferably a split tube of resilient flexible metal with a continuous axial gap 46.

When this locking member 44 is radially compressed and inserted into the aligned locking openings 30 and 38, it resiliently expands radially to provide a tight locking fit. Fasteners or spot welds can be applied at one or both ends of the member 44 further to hold the assembly in place if desired.

Figure 11:
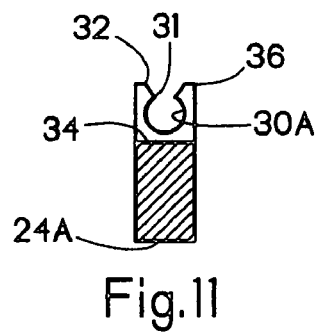
FIG. 11 is an enlarged cross sectional view of another embodiment of a cross bar for the grille.

In FIG. 11 there is illustrated an alternative cross bar structure designated as 24A. Cross bars 24A may be used with the bearing bars 22 and locking member 44 of the grille 20. Cross bar 24A has a first locking opening 30A that has a circular portion and a neck portion 31. The cross bar 24A functions in general the same as the cross bar 24, and may be more suitable for economic manufacturing methods such as extrusion.

Figure 12:
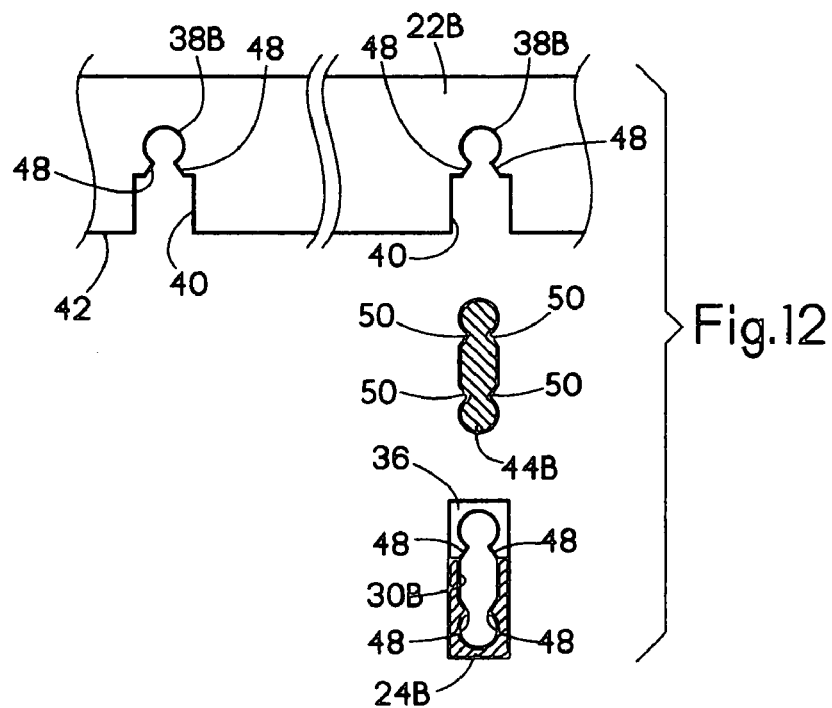
FIG. 12 is a view like FIG. 10 showing yet another embodiment for the cross bar, bearing bar and locking member for the grille of the present invention.

In FIG. 12 there is illustrated yet another embodiment of the invention. A cross bar 24B has a first locking opening 30B that is elongated rather than circular. Part of the opening 30B extends through the projections 36, while the remainder of the opening 30B extends through the cross bar 24B below the recesses 34 and projections 36. The bearing bar 22B has second locking openings 38B that extend to the notches 40 and that are the same shape as the portions of the openings 30B in the projections 36. The locking member 44B, rather than being circular, has the same shape as the first locking openings 30B in the cross bars 24B. Inwardly extending projections 48 of the locking openings 30B and 38B and mating inwardly extending grooves 50 of the locking member 44B augment the locking effect of the locking member 44B in the openings 30*b* and 38B and positively prevent the bearing bars 22B from being separated from the cross bars 24B in the completed assembly.

While the present invention has been described with reference to the details of the embodiments of the invention shown in the drawing, these details are not intended to limit the scope of the invention as claimed in the appended claims.

What is claimed is:

1. A grille comprising:
a plurality of first bars extending in a first direction;
a plurality of second bars extending in a second direction and crossing said first bars at intersections;
said first bars each including a crenellated edge having a plurality of alternating recesses and projections;
said second bars being nested in said recesses of said first bars at said intersections, and said projections being sandwiched between said second bars between said intersections;
said grille being characterized by:
each said first bar including a first locking opening extending lengthwise within said first bar, at least a part of said first locking opening extending through said projections;
each said second bar being generally solid except for a plurality of second locking openings and a plurality of notches, with said second locking openings and said notches each extending transversely through said second bar;
said first and second locking openings being aligned when said second bars are nested in said recesses of said first bars; and
locking members extending through said first and second locking openings to interlock said first and second bars.

2. A grille as claimed in claim 1, wherein said plurality of notches of each of said second bars are spaced apart, with one of said notches being located at each said intersection, and further wherein said first bars are received in said notches.

3. A grille as claimed in claim 1, said first and second locking openings having the same cross section shape.

4. A grille as claimed in claim 3, said locking members having the same cross section shape as said first and second locking openings.

5. A grille as claimed in claim 1, said first and second locking openings being at least partly circular and said locking members being circular members.

6. A grille as claimed in claim 5, said first locking openings being located entirely within said projections of said first bars.

7. A grille as claimed in claim 1, said first and second locking openings having a noncircular, elongated cross section shape, said first locking openings being located partly within and partly outside of said projections of said first bars.

8. A grille as claimed in claim 7, said locking members having the same cross section shape as said first locking openings.

9. A grille as claimed in claim 8, said locking openings and locking members having inwardly extending lock portions preventing movement of said second bars from said nested position.

10. A grille comprising:
    a plurality of first bars extending in a first direction;
    a plurality of second bars extending in a second direction and crossing said first bars at intersections;
    said first bars each including a crenellated edge having a plurality of alternating recesses and projections;
    said second bars being nested in said recesses of said first bars at said intersections, and said projections being sandwiched between said second bars between said intersections;
    said grille being characterized by:
    each said first bar including a first locking opening extending lengthwise within said first bar, at least a part of said first locking opening extending through said projections;
    each said second bar including a plurality of second locking openings extending transversely through said second bar;
    said first and second locking openings being aligned when said second bars are nested in said recesses of said first bars; and
    locking members extending through said first and second locking openings to interlock said first and second bars, said first and second locking openings being at least partly circular and said locking members being circular members,
    said locking members being hollow split tubes.

11. A grille comprising:
    a plurality of first bars extending in a first direction;
    a plurality of second bars extending in a second direction and crossing said first bars at intersections;
    said first bars each including a crenellated edge having a plurality of alternating recesses and projections;
    said second bars being nested in said recesses of said first bars at said intersections, and said projections being sandwiched between said second bars between said intersections;
    said grille being characterized by:
    each said first bar including a first locking opening extending lengthwise within said first bar, at least a part of said first locking opening extending through said projections, wherein each said first bar is generally solid except for said crenellated edge and said first locking opening;
    each said second bar including a plurality of second locking openings extending transversely through said second bar;
    said first and second locking openings being aligned when said second bars are nested in said recesses of said first bars; and
    locking members extending through said first and second locking openings to interlock said first and second bars.

12. A grille as claimed in claim 11, each said second bar including a plurality of spaced apart notches, one said notch being located at each said intersection, said first bars being received in said notches.

13. A grille as claimed in claim 11, said first and second locking openings having the same cross section shape.

14. A grille as claimed in claim 13, said locking member having the same cross section shape as said first and second locking openings.

15. A grille as claimed in claim 11, said first and second locking openings being at least partly circular and said locking members being circular members.

16. A grille as claimed in claim 15, said locking members being hollow split tubes.

\* \* \* \* \*